United States Patent
Ma et al.

(10) Patent No.: US 8,468,560 B2
(45) Date of Patent: Jun. 18, 2013

(54) APPARATUS AND METHOD OF SETTING CHANNEL

(75) Inventors: Hsiang-Yi Ma, New Taipei (TW); Ming-Jih Chiu, New Taipei (TW)

(73) Assignee: A VerMedia Technologies, Inc., New Taipei City (TW)

( * ) Notice: Subject to any disclaimer, the term of this patent is extended or adjusted under 35 U.S.C. 154(b) by 201 days.

(21) Appl. No.: 13/044,503

(22) Filed: Mar. 9, 2011

(65) Prior Publication Data
US 2012/0233636 A1   Sep. 13, 2012

(51) Int. Cl.
*H04N 7/16* (2011.01)
(52) U.S. Cl.
USPC .................................. 725/27; 725/12; 725/14
(58) Field of Classification Search
USPC ................................................ 725/12, 14, 27
See application file for complete search history.

(56) References Cited

U.S. PATENT DOCUMENTS

2008/0066111 A1 *   3/2008   Ellis et al. ...................... 725/57

FOREIGN PATENT DOCUMENTS

| CN | 1115947 A | 1/1996 |
| CN | 1937723 A | 3/2007 |
| CN | 101478649 A | 7/2009 |
| KR | 10-2005-0073009 A | 7/2005 |

* cited by examiner

*Primary Examiner* — Hunter B Lonsberry
(74) *Attorney, Agent, or Firm* — CKC & Partners Co., Ltd.

(57) ABSTRACT

A method and an apparatus of setting a channel are disclosed, wherein the method includes steps as follows. First, a channel is locked as a locked channel. Then, when the locked channel is switched to another channel, a screen is controlled to display information related to the locked channel, and first duration after the locked channel is switched to foresaid another channel is counted. Then, a prompting is performed when the first duration exceeds a first predetermined period.

12 Claims, 5 Drawing Sheets

APPARATUS AND METHOD OF SETTING CHANNEL

BACKGROUND

1. Technical Field

The present disclosure relates to methods and apparatuses of setting, and more particularly, methods and apparatuses of setting channels.

2. Description of Related Art

Nowadays cable television or satellite TV serves with numerous television channels. According to survey, many users usually switches the current channel to another during television advertisement and then switches foresaid another channel to previous one after a period of time.

However, the users may forget the television advertisement is over and therefore miss the programs of the previous channel. Or the users may forget the channel number and therefore waste time for finding the previous channel out.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to methods and apparatuses of setting channels for reducing, solving or circumventing the foregoing and other problems.

According to one embodiment of the present invention, an apparatus of setting a channel includes a lock unit, a control unit, a timing unit and a prompting unit. The lock unit can lock the channel as a locked channel. The control unit can control a screen to render information related to the locked channel when the locked channel has been switched to another channel. The timing unit can count duration after the locked channel is switched to aforesaid another channel. The prompting unit can perform a prompting when the duration exceeds a first predetermined period.

The apparatus may further include a receiver and a switching unit. The receiver can receive a switching command. The switching unit can switch the locked channel to foresaid another channel according to the switching command.

Additionally, the receiver can receive a return command. The switching unit can switch foresaid another channel to the locked channel according to the return command.

Alternatively, the timing unit further counts second duration during which the prompting is being performed. The switching unit can switch foresaid another channel to the locked channel when the second duration exceeds a second predetermined period.

Furthermore, the receiver can receive a delay command. The switching unit can extend the second predetermined period for a span of time based on the delay command before foresaid another channel is switched to the locked channel.

The prompting unit can command the screen to render prompting information.

Furthermore, the receiver can receive a lock command when the screen displays a frame of the channel. The lock unit can lock the channel as the locked channel according to the lock command.

Alternatively, the timing unit can count a length of time the screen displays a frame of the channel unceasingly. The lock unit can lock the channel as the locked channel when the length of time exceeds a preset time.

According to another embodiment of the present invention, a method setting a channel includes steps as follows. First, a channel is locked as a locked channel. Then, when the locked channel has been switched to another channel, a screen is controlled to display information related to the locked channel, and duration after the locked channel is switched to aforesaid another channel is counted. Then, a prompting is performed when the first duration exceeds a first predetermined period.

In this method, a switching command is received, and the locked channel is switched to foresaid another channel according to the switching command.

Additionally, in this method, a return command is received, and foresaid another channel is switched to the locked channel according to the return command.

Alternatively, in this method, second duration during which the prompting is being performed is counted, and foresaid another channel is switched to the locked channel when the second duration exceeds a second predetermined period.

Furthermore, in this method, a delay command is received, and the second predetermined period is extended for a span of time based on the delay command before foresaid another channel is switched to the locked channel.

The step of performing the prompting includes commanding the screen to render prompting information.

Furthermore, a lock command is received when the screen displays a frame of the channel, and the channel can be locked as the locked channel according to the lock command.

Alternatively, a length of time the screen displays a frame of the channel unceasingly is counted, and the channel can be locked as the locked channel when the length of time exceeds a preset time.

Technical advantages are generally achieved, by embodiments of the present invention, as follows:

1. By using the apparatus and/or method of the present invention, a user can set the locked channel, and thereby the prompting can remind he or she about the program of the locked channel in good time; and 2. The function of switching the current channel to the locked channel facilitates that the user watches the program of the locked channel.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
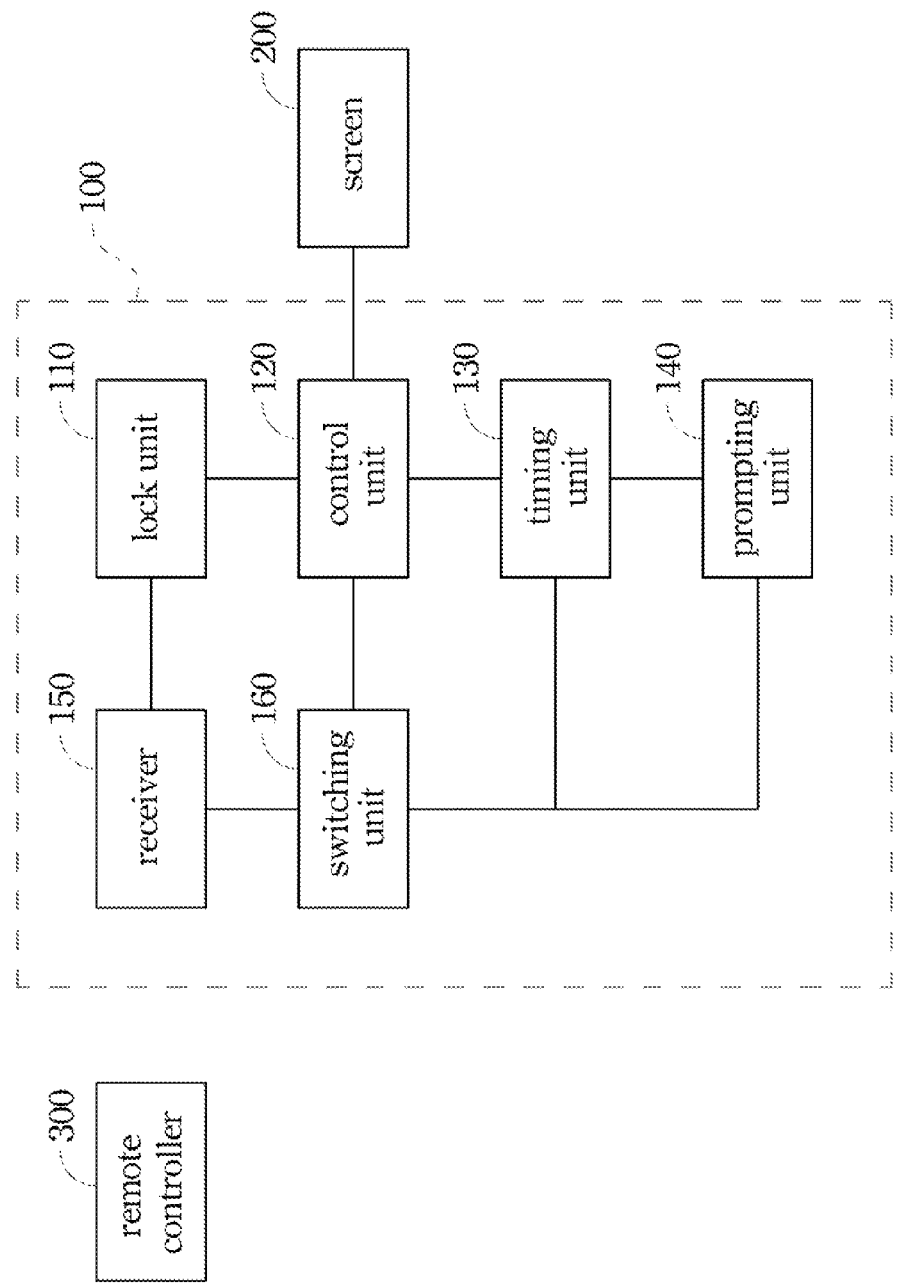
FIG. 1 is a block diagram of an apparatus of setting a channel according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an apparatus 100 of setting a channel according to one embodiment of the present disclosure. As shown in FIG. 1, the apparatus 100 includes a lock unit 110, a control unit 120, a timing unit 130, a prompting unit 140, a receiver 150 and a switching unit 160.

The lock unit 110 is coupled with the control unit 120 and the receiver 150. The control unit 120 is coupled with the timing unit 130, the switching unit 160 and the screen 200. The timing unit 130 is coupled with the prompting unit 140 and the switching unit 160. The prompting unit 140 is coupled with the switching unit 160 and the screen 200. For example, the screen 200 may be a television screen, a display screen or the like, and the receiver 150 may be an infrared receiver, a bluetooth receiver, another wireless receiver or the like.

In use, the lock unit 110 can lock a channel as a locked channel. For example, the channel may be a television channel, a video channel, or the like, or the combination thereof.

For a more complete understanding of setting the locked channel, refer to FIG. 1. For example, a user utilizes a remote controller 300 to send out a lock command when the screen 200 displays a frame of a channel, so that the receiver 150 can receive the lock command, and the lock unit 110 can lock this channel as the locked channel according to the lock command. Thus, the user can set the locked channel manually.

Alternatively, when the screen 200 displays a frame of a channel, the timing unit 130 can count a length of time the screen 200 displays a frame of a channel unceasingly. When the length of time exceeds a preset time, which signifies that the user wants to watch this channel, the lock unit 110 can lock this channel as the locked channel. Thus, the apparatus 100 can set the locked channel automatically.

If the user wanted to switch one channel to another, he or she would utilize the remote controller 300 to send out a switching command, so that the receiver 150 can receive the switching command, and the switching unit 160 can switch the locked channel to foresaid another channel according to the switching command. Thus, the user can switch the current channel to another during television advertisement or unfavorable programs.

When the locked channel has been switched to another channel, the screen 200 displays a frame of aforesaid another channel, so that the control unit 120 can control the screen 200 to render information related to the locked channel in this frame. For example, the information related to the locked channel may be a name of the locked channel, a number of the locked channel, a snapshot picture of the locked channel, duration from the beginning of leaving the locked channel to the present time, another message or the combination thereof. Thus, the user can become aware of the locked channel.

The timing unit 130 can count duration after the locked channel is switched to another. Then, the prompting unit 140 can perform a prompting when the duration exceeds a first predetermined period. Thus, the prompting can remind the user about the program of the locked channel in good time.

For example, the prompting unit 140 may command the screen 200 to render prompting information as aforesaid prompting, e.g. a flashing sign, a literal symbol or the like. Alternatively or additionally, the prompting unit 140 may be coupled with a loudspeaker and control the loudspeaker to make prompting sound effects. Those with ordinary skill in the art may make a design choice depending on the desired application.

If the user wanted to switch aforesaid another channel to the locked channel, he or she would utilize the remote controller 300 to send out a return command, so that the receiver 150 can receive the return command, and the switching unit 160 can switch foresaid another channel to the locked channel according to the return command. Thus, this function of switching the current channel to the locked channel facilitates that the user watches the program of the locked channel.

Alternatively, the timing unit 130 counts second duration during which the prompting is being performed. The switching unit 160 switches said another channel to the locked channel when the second duration exceeds a second predetermined period, so that the screen 200 displays a frame of the locked channel. Thus, this function of switching the current channel to the locked channel facilitates that the user watches the program of the locked channel.

Those with ordinary skill in the art may choice suitable values for the first and second predetermined period and the preset time depending on the desired application. For example, the preset time may be 300 seconds, the first predetermined period may be 60 seconds, and the second predetermined period may be 180 seconds.

Furthermore, the remote controller 300 can send out a delay command when the user is using it. The receiver 150 can receive the delay command. The switching unit 160 can extend the second predetermined period for a span of time, e.g. 10 seconds, based on the delay command before aforesaid another channel is switched to the locked channel. One of ordinary skill in the art will appreciate that the above example of 10 seconds is provided for illustrative purposes only to further explain applications of the switching unit 160 and are not meant to limit the present invention in any manner. In practice, the user could use the remote controller 300 to set the span of time. Alternatively, the user would press a button, such as a channel display key or a volume key, of the remote controller 300 to send out the delay command if he or she wanted to proceed to watch the current channel. The switching unit 160 can extend the second predetermined period for a span of time based on the delay command before the current channel is switched to the locked channel.

The lock unit 110, the control unit 120, the timing unit 130, the prompting unit 140 and the switching unit 160 may be hardware, software and/or firmware. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware.

One of ordinary skill in the art will appreciate that the above denomination is provided for illustrative purposes only to further explain applications of these units and are not intended to limit these units in any manner. In one or more embodiments, one unit may be divided into various units, or one unit may be integrated into another unit. Those with ordinary skill in the art may design one or more unites depending on the desired application.

Figure 2:
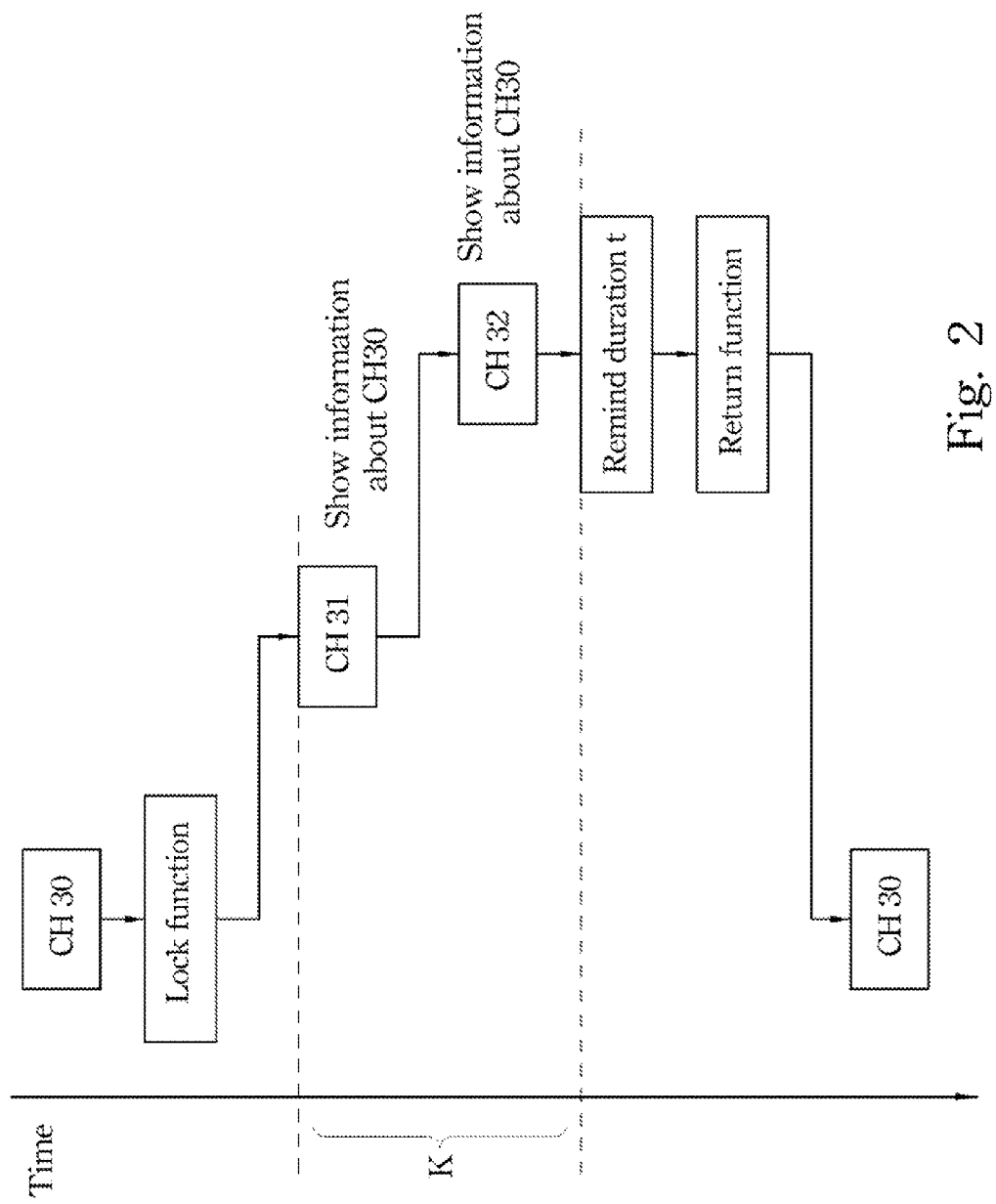
FIG. 2 is a timing diagram of the apparatus in use according to one embodiment of the present disclosure.

FIG. 2 is a timing diagram of the apparatus in use according to one embodiment of the present disclosure. As shown in FIG. 2, the screen 200 displays the program of the channel 30 (CH30) for example. As to the lock function, the user can utilize the remote controller 300 for controlling the apparatus 100 to lock the channel 30 (CH30) as the locked channel manually. Alternatively, the apparatus 100 locks the channel 30 (CH30) as the locked channel automatically when a length of time that the screen 200 displays frames of the channel 30 (CH30) exceeds the preset time.

Figure 3:
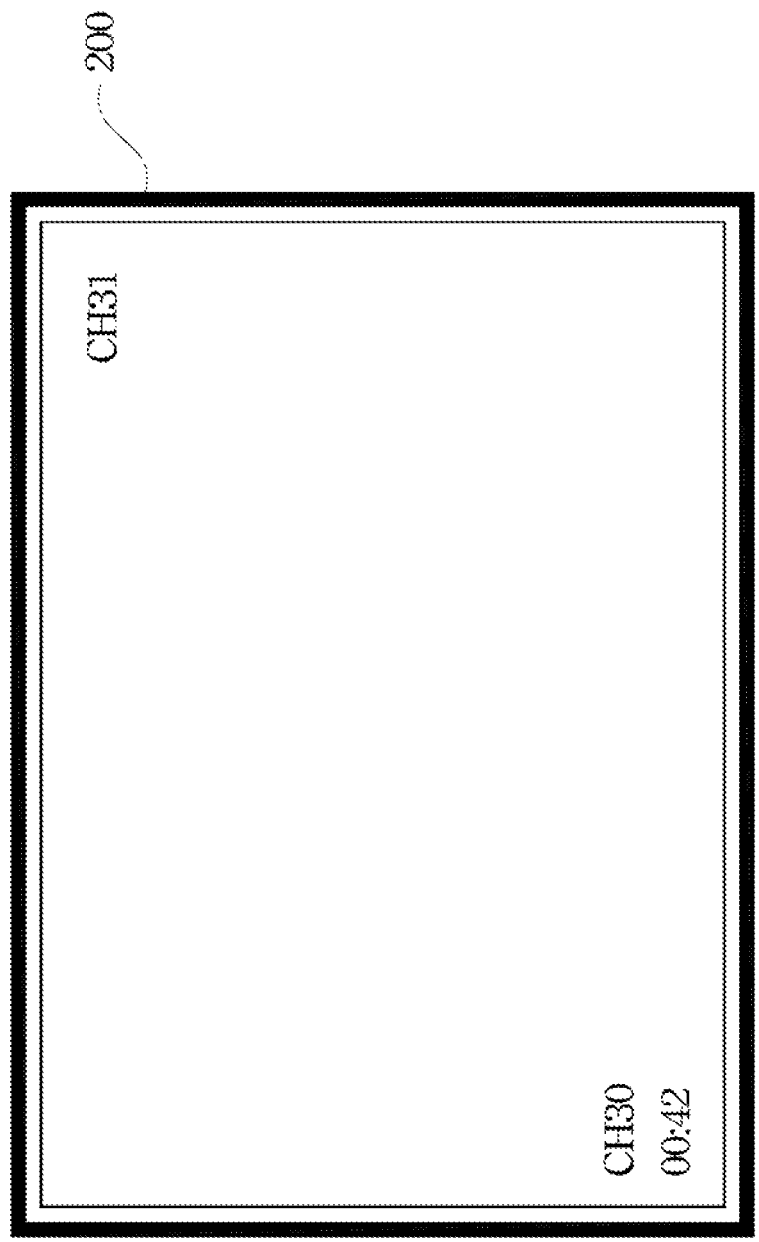
FIG. 3 is a schematic diagram of a screen according to one embodiment of the present disclosure.

During television advertisement or unfavorable programs, the user can utilize the remote controller 300 for controlling the apparatus 100 to switch the channel 30 (CH30) to another, such as a channel 31 (CH31), a channel 32 (CH32) or the like:

When the locked channel (CH30) has been switched to another channel (CH31), the screen 200 displays a frame of the channel (CH31) and renders information related to the locked channel (CH30) in this frame. In FIG. 3, the screen 200 displays the frame of the channel (CH31) and renders information related to the locked channel (CH30) at the lower left corner, such as the number "CH30" of the locked channel and the duration "00: 42" from the beginning of leaving the locked channel to the present time.

The screen 200 shows the duration t as the prompting after the locked channel (CH30) is switched to another when the duration t exceeds the first predetermined period K. As to the return function, the user can utilize the remote controller 300 for controlling the apparatus 100 to switch the current channel to the locked channel (CH30). Alternatively, the apparatus 100 switches the current channel to the locked channel (CH30) automatically when the duration t exceeds the second predetermined period.

Figure 4:
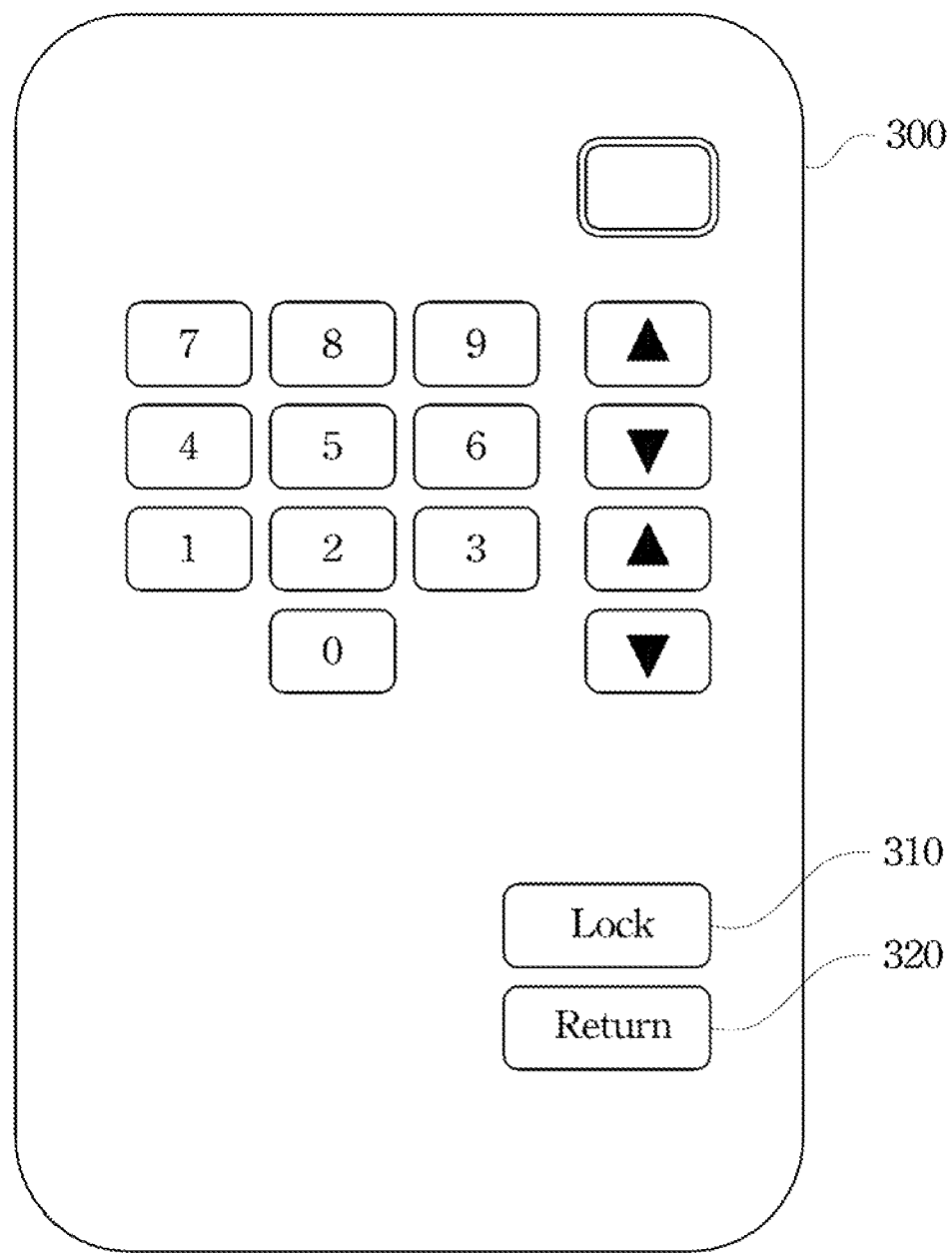
FIG. 4 is a schematic diagram of a remote controller according to one embodiment of the present disclosure.

FIG. 4 is a schematic diagram of a remote controller 300 according to one embodiment of the present disclosure. As shown in FIG. 4, the remote controller 300 has a locking key 310 and a return key 320. In use, the user presses the locking key 310 when the screen 200 displays frames of a channel, so that the remote controller 300 can send out the lock command, and then the apparatus 100 can lock this channel as the locked channel according to the lock command.

When the user wants to switch the current channel to the locked channel, he or she presses the return key 320, so that the remote controller 300 can send out the return command, and then the apparatus 100 can switch the current channel to the locked channel. Thus, the screen 200 can displays the frames of the locked channel.

Figure 5:
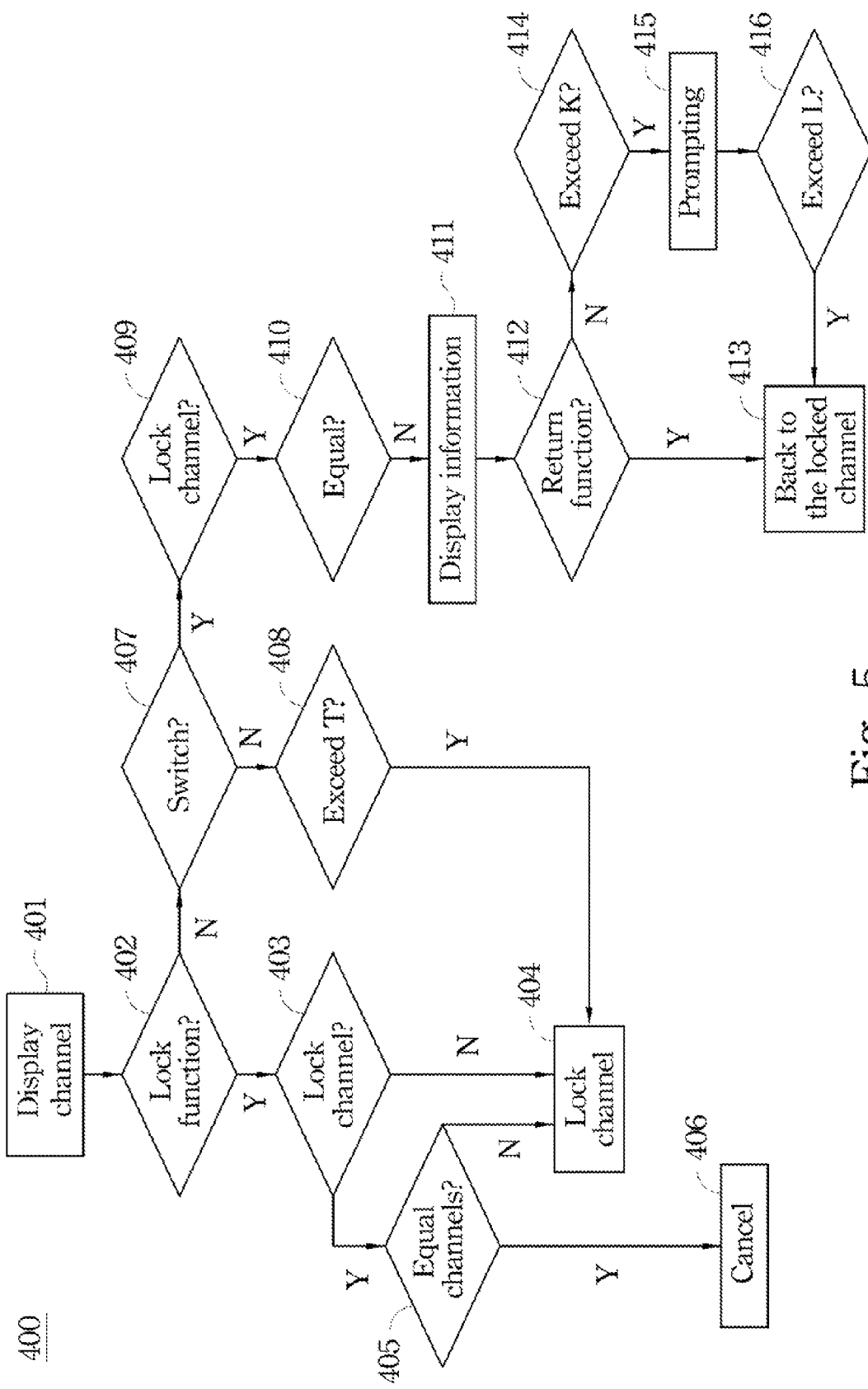
FIG. 5 is a flowchart of a method of setting a channel according to another embodiment of the present disclosure.

FIG. 5 is a flowchart of a method 400 of setting a channel according to another embodiment of the present disclosure. As shown in FIG. 5, the method 400 includes steps 401-416 as follows (The steps are not recited in the sequence in which the steps are performed. That is, unless the sequence of the steps is expressly indicated, the sequence of the steps is interchangeable, and all or part of the steps may be simultaneously, partially simultaneously, or sequentially performed). It should be noted that those implements to perform the steps in the method 400 are disclosed in above embodiments and, thus, are not repeated herein.

A frame of the current channel is displayed in step 410, so that the user can watch this channel. Then, whether a lock function is utilized is determined in step 402. When the lock function is utilized, whether any channel is locked is determined in step 403. When step 403 determines that no channel has been locked, the current channel is locked as the locked channel in step 404.

For example, when the screen is displaying frames of the current channel in step 401, and when a lock command is received from the remote controller in step 403, the current channel can be locked as the locked channel according to the lock command in step 404.

When step 403 determines that locked channel exists, whether the locked channel is equal to the current channel is determined in step 405. The lock function is canceled for the current channel when the locked channel is equal to the current channel; on the contrary, the current channel is locked as the locked channel when the locked channel isn't equal to the current channel.

When step 402 determines that the lock function isn't utilized, whether the current channel is switched to another in step 407. For example, step 407 determines that the current channel is switched to another according to a switching command when the switching command has been received.

When the current channel isn't switched to another, whether a length of time that the screen displays a frame of the channel unceasingly exceeds a preset time T is determined in step 408. When the length of time exceeds the preset time T, the current channel is locked as the locked channel in step 404.

For example, the length of time the screen displays frames of the current channel unceasingly is counted when the screen is displaying the frames of the current channel in step 401. When step 408 determines that the length of time exceeds the preset time, the current channel is locked as the locked channel in step 404.

On the contrary, when step 407 determines that the current channel is switched to another, whether any channel is locked is determined in step 409. When the locked channel exists, whether the locked channel is equal to the current channel is determined in step 410. When the locked channel isn't equal to the current channel, the screen is controlled to display information related to the locked channel, and duration after the locked channel is switched to aforesaid another channel is counted in step 411.

Then, whether a return function is utilized is determined in step 412. When the return function is utilized, the current channel is switched to the locked channel in step 413. For example, when a return command is received in step 412, it is determined that the return function is utilized, and then the current channel is switched to the locked channel according to the return command.

On the contrary, when the return function is utilized, whether the duration after the locked channel is switched to another channel exceeds a first predetermined period K is determined in step 414. When the duration exceeds the first predetermined period K, a prompting is performed in step 415; for example, the screen is commanded to render prompting information, e.g. a literal symbol of duration from the beginning of leaving the locked channel to the present time.

In step 416, second duration during which the prompting is being performed is counted, and whether the second duration exceeds a second predetermined period L is determined. When the second duration exceeds the second predetermined period L, and when the user doesn't operate the remote controller, the current channel is switched to the locked channel in step 413.

Furthermore, the user may use the remote controller to send out a delay command. In step 416, the delay command is received, and the second predetermined period is extended for a span of time, e.g. 10 seconds, based on the delay command before the current channel is switched to the locked channel. One of ordinary skill in the art will appreciate that the above example of 10 seconds is provided for illustrative purposes only to further explain applications of the switching unit 160 and are not meant to limit the present invention in any manner. In practice, the user could use the remote controller to set the span of time. Alternatively, the user would press a button, such as a channel display key or a volume key, of the remote controller to send out the delay command if he or she wanted to proceed to watch the current channel. In step 416, the second predetermined period is extended for a span of time based on the delay command before the current channel is switched to the locked channel.

The method 400 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. An apparatus of setting a channel, the apparatus comprising:
    a lock unit for locking the channel as a locked channel;
    a timing unit for counting a duration from a beginning of leaving the locked channel to the present time after the locked channel is switched to another channel;
    a control unit for controlling a screen to render information related to the locked channel when the locked channel has been switched to aforesaid another channel, the information comprising a literal symbol of the duration;
    a prompting unit for performing a prompting when the duration exceeds a first predetermined period, and the timing unit further counting a second duration during which the prompting is being performed;
    a switching unit for switching said another channel to the locked channel when the second duration exceeds a second predetermined period; and
    a receiver for receiving a delay command, wherein the switching unit extends the second predetermined period for a span of time based on the delay command before said another channel is switched to the locked channel.

2. The apparatus of claim 1, further comprising:
    a receiver for receiving a switching command; and
    a switching unit for switching the locked channel to said another channel according to the switching command.

3. The apparatus of claim 1, further comprising:
    a receiver for receiving a return command; and
    a switching unit for switching said another channel to the locked channel according to the return command.

4. The apparatus of claim 1, wherein the prompting unit commands the screen to render prompting information.

5. The apparatus of claim 1, further comprising:
    a receiver for receiving a lock command when the screen displays a frame of the channel, wherein the lock unit locks the channel as the locked channel according to the lock command.

6. The apparatus of claim 1, wherein the timing unit counts a length of time the screen displays a frame of the channel unceasingly, and the lock unit locks the channel as the locked channel when the length of time exceeds a preset time.

7. A method of setting a channel, the method comprising:
    locking the channel as a locked channel;
    counting a duration from a beginning of leaving the locked channel to the present time after the locked channel is switched to another channel;
    controlling a screen to render information related to the locked channel when the locked channel has been switched to aforesaid another channel, the information comprising a literal symbol of the duration;
    performing a prompting when the duration exceeds a first predetermined period;
    counting a second duration during which the prompting is being performed;

switching said another channel to the locked channel when the second duration exceeds a second predetermined period;

receiving a delay command; and extending the second predetermined period for a span of time based on the delay command before said another channel is switched to the locked channel.

8. The method of claim 7, further comprising:

receiving a switching command; and switching the locked channel to said another channel according to the switching command.

9. The method of claim 7, further comprising:

receiving a return command; and switching said another channel to the locked channel according to the return command.

10. The method of claim 7, wherein the step of performing the prompting comprises:

commanding the screen to render prompting information.

11. The method of claim 7, wherein the step of locking the channel as the locked channel comprises:

receiving a lock command when the screen displays a frame of the channel; and locking the channel as the locked channel according to the lock command.

12. The method of claim 7, wherein the step of locking the channel as the locked channel comprises:

counting a length of time the screen displays a frame of the channel unceasingly; and locking the channel as the locked channel when the length of time exceeds a preset time.

* * * * *